United States Patent [19]

Shy

[11] 4,063,703
[45] Dec. 20, 1977

[54] FOLDING MEANS FOR SUPPORTING LEGS OF ROASTER OVEN WITH HIGH STABILITY

[76] Inventor: Min Ching Shy, 20, Alley 18, Lane 109, Hoping Street, Yang Ho Town, Taipei Hsien, China /Taiwan

[21] Appl. No.: 757,054

[22] Filed: Jan. 5, 1977

[51] Int. Cl.² .................... F16M 11/38; F24C 15/08
[52] U.S. Cl. ................................... 248/439; 108/132; 126/304 A; 248/188.6
[58] Field of Search ................... 108/115, 132, 131; 248/188.6, 439; 126/304 A, 9 R, 30, 38, 275 R

[56] References Cited

U.S. PATENT DOCUMENTS

| 184,508 | 11/1876 | Corban | 108/131 |
|---|---|---|---|
| 438,947 | 10/1890 | Reed | 108/132 |
| 902,245 | 10/1908 | Montgomery | 108/131 |
| 2,497,994 | 2/1950 | Jones | 126/9 R |
| 3,503,324 | 3/1970 | Gmeiner | 126/9 R |
| 3,695,567 | 10/1972 | Weagle | 108/132 |

Primary Examiner—James T. McCall
Attorney, Agent, or Firm—Karl W. Flocks

[57] ABSTRACT

A folding means for supporting legs of roaster oven with high stability comprises: a fixing plate fixed on the bottom of roaster oven and a U-shaped movable frame in which said U-shaped frame is movably fixed to said fixing plate by movably connecting two extending brackets of the fixing plate with two sides of said U-shaped frame; a tongue plate is vertically extended from the front edge of said fixing plate so that, whenever the U-shaped movable frame is moving toward one side of said fixing plate, the tongue plate may parallelly be pressed into inner side of the front portion of said U-shaped movable frame and then be engaged by means of a screw which is correspondingly provided on the U-shaped frame. By means of these parts, the fixing plate may be integrated with the U-shaped frame so as to stabilize the supporting legs of roaster oven when the oven is at the standing position.

5 Claims, 5 Drawing Figures

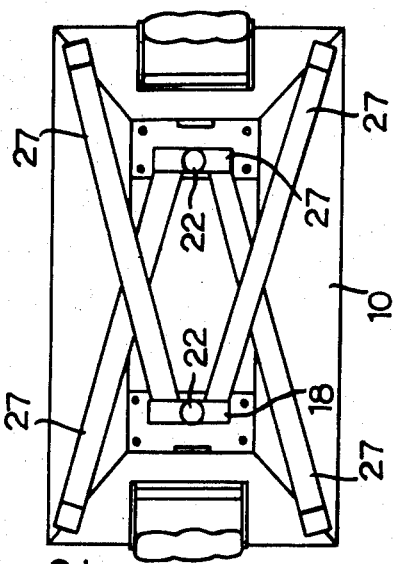
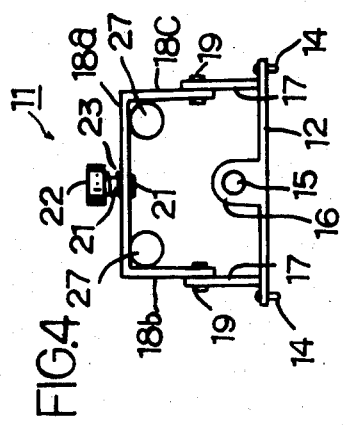
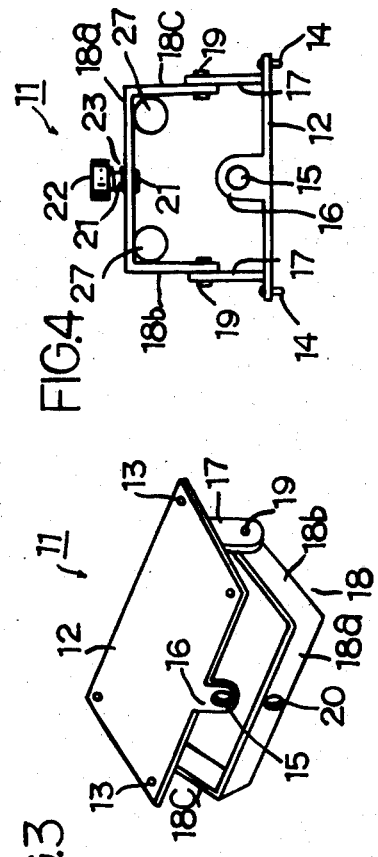
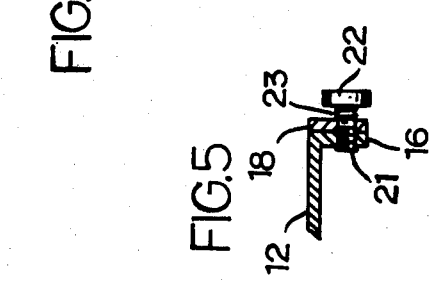
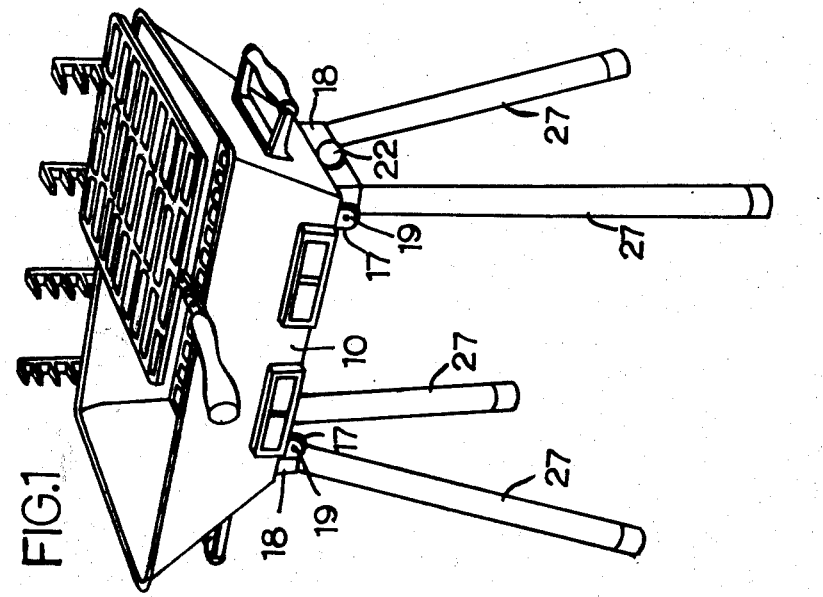

FOLDING MEANS FOR SUPPORTING LEGS OF ROASTER OVEN WITH HIGH STABILITY

BACKGROUND OF THE INVENTION

The present invention relates to a folding means for supporting legs of roaster oven with high stability and, more particalarly, to a folding means for supporting legs of roaster oven which may substantially integrate the roaster oven with the supporting legs thereof and stabilize said oven when the supporting legs are at a standing position.

Generally, the conventional roaster ovens are not arbitrarily folded. They are difficultly handled. As their bigger volume and difficult packing, the transportation measurement can not be reduced and the freight will be costed higher. Furthermore, the conventional ovens have the unstable supporting legs when they are standing.

The present inventor has improved the above-mentioned defects to disclose the present folding means for supporting legs of roaster oven.

SUMMARY OF THE INVENTION

The present invention provides a folding means for supporting legs of roaster oven with high stability comprising:

a fixing plate fixed on one side of the body bottom, having an extending tongue plate on the front portion of said plate and having two extending vertical brackets on both sides thereof;

an U-shaped movable frame of which both sides being connected to the two brackets on said fixing plate by short shaft and being foldable and extendible;

a fixing screw being provided on the central position of the front U-shaped frame and having an adjusting rotating button for extending or retracting said screw, and two supporting units which being respectively fixed into two corners inside the U-shaped movable frame.

By extending the supporting units and supporting legs, the roaster oven will then be stabilized and will not be easily vibrated as being thrusted.

BRIEF DESCRIPTION OF THE DRAWING

FIG. 1 is the perspective drawing of roaster oven having folding means for supporting legs for stabilization use.

FIG. 2 is the bottom view drawing when folding the supporting legs of the roaster oven.

FIG. 3 is the perspective drawing of the folding means for supporting leg of the present roaster oven.

FIG. 4 is the front view drawing of the present folding means as being folded.

FIG. 5 is the partial sectional drawing of the combination of the fixing plate with the movable frame by fixing screw in accordance with the present invention.

DESCRIPTION OF THE PREFERRED EMBODIMENT

As shown in FIG. 1 and FIG. 2, the folding means for supporting legs of roaster oven of the present invention comprises an oven body 10 and two sets of foldable means 11 of supporting legs which are respectively provided on both sides of the bottom of said oven body 10.

Referring FIG. 3 and FIG. 4, the folding means of supporting legs 11 comprises a fixing plate 12 in which several screw holes 13 are provided thereon so that the screw 14 can be used to fix said fixing plate to one side of the bottom of body 10. A tongue plate 16 having screw hole 15 is extended from the front side of said fixing plate 12. Two extending brackets 17 are oppositedly extended from both sides of said fixing plate 12 so as to connect two side plates or leg portions 18b, 18c, of the U-shaped frame 18 by means of the short shafts 19 in that the frame 18 can be folded and extended along the shaft 19.

A screw hole 20 is provided on the central position of an intermediate portion 18a appearing in FIG. 3 as the front side connecting leg portions 18b, 18c of frame 18 which may be moved into registration with the hole 15 of the tongue plate 16 so as to allow the engagement of a fixing screw 21. A rotating button 22 is provided at the end of said screw 21 and an extention 21a with slightly larger diameter than said hole 20 is provided at another end so as to prevent loosing said screw 21 from screw hole 20.

Four supporting units 27 are provided for the four legs in accordance with the present invention. Each set consisting of two supporting units 27 is fixed onto the folding means 11. Each set of the two supporting units 27 is fixed into both corners inside the front portion 18a of the U-shaped frame 18.

Whenever standing the supporting legs of the present roaster oven, the U-shaped frame 18 of the folding means 11 is moved toward the fixing plate 12 so that the tongue plate 16 of the fixing plate 12 is paralelly pressed into the U-shaped frame 18 and the front end of screw 21 is engaging with the screw hole 15 of the tongue plate 16. By adjusting the screw 21 to engage with the screw hole 15, the fixing plate 12 and the U-shaped movable frame 18 is combined integratedly (as shown in FIG. 5) and the oven body 10 is sturdily fixed with four supporting units 27 of the oven legs. (as shown in FIG. 1)

The supporting legs will then have the strong stability and will not be vibrated after being thrusted.

Whenever folding the supporting legs, the rotating button 22 can be rotated in a counter direction so as to retract the screw 21 from the engaging position with screw hole 15. The U-shaped frame 18 will then leave the fixing plate 12. By folding the supporting units 27 onto the bottom of body 10 as shown in FIG. 2.

At this time, the U-shaped frame 18 and the fixing plate 12 forming the present folding means will be in a vertical position as shown in FIG. 4.

Furthermore, a spring 23 is provided on the fixing screw 21 as shown in FIG. 4 so as to prevent from the obstruction by extending said screw 21 as next engagement by the screw 21 with the tongue plate 16.

According the present invention, the folding means may also be used for supporting legs of tables and chairs except for roaster oven. The usage of the present folding means in not limited. Several changes can be made within the scope of the present invention.

I claim:

1. A foldable means for supporting legs of a roaster oven or the like having an oven body and two sets of said foldable means for supporting legs, said foldable means in assembly being provided respectively on both ends of the bottom of an oven body; said foldable means comprising:

a fixing plate fixed on the bottom of the body adjacent one end thereof and having a downwardly extending tongue plate adjacent its end of the oven body and two downwardly extending vertical brackets on opposite sides thereof;

a U-shaped frame with means pivotally connecting the free ends of said U-shaped frame to the two brackets on said fixing plate whereby said frame is foldable and extendable;

said tongue plate having a screw hole;

a fixing screw being provided on the central position of an intermediate portion of said U-shaped frame connecting leg portions thereof, said screw having an adjusting rotating button for extending or retracting said screw, and two supporting legs each of which is respectively fixed in two corners inside the U-shaped frame, said U-shaped frame being pivotally adjustable to the extent that said screw may be inserted into said screw hole.

2. A foldable means for supporting legs of roaster oven according to claim 1 wherein said U-shaped movable frame is freely folded or extended so as to effect folding or standing of the supporting legs.

3. A foldable means for supporting legs of roaster oven according to claim 1 wherein said tongue plate is provided on the central portion of said fixing plate so as to engage with the screw to parallelly press said U-shaped frame toward said fixing plate so that the folding means may be suitably fixed and stabilized.

4. A foldable means according to claim 1, wherein the outer front end of said fixing screw has a slightly larger diameter than that of said screw hole.

5. A foldable means according to claim 1 wherein a spring is provided on said fixing screw.

* * * * *